United States Patent [19]
Cannon et al.

[11] 3,807,923
[45] Apr. 30, 1974

[54] INJECTION/BLOW-MOULDING APPARATUS

[75] Inventors: Geoffrey Donald Cannon; Roderick Michael De'Ath; Donald Ernest Griffiths, all of Swindon, England

[73] Assignee: The Metal Box Company Limited, London, England

[22] Filed: Jan. 10, 1973

[21] Appl. No.: 322,319

[52] U.S. Cl...425/242 B, 425/324 B, 425/DIG. 209, 425/DIG. 211, 425/DIG. 213
[51] Int. Cl............................................. B29d 23/03
[58] Field of Search....... 425/242 B, 324 B, 326 BJ, 425/342, 387 B, DIG. 211, DIG. 213, DIG. 209

[56] References Cited
UNITED STATES PATENTS

| | | | |
|---|---|---|---|
| 3,584,337 | 6/1971 | Aoki | 425/326 BJ |
| 3,609,803 | 10/1971 | Fattori | 425/326 BJ |
| 3,707,591 | 12/1972 | Chalfont | 425/242 B |
| 3,733,162 | 5/1973 | Farkas | 425/324 B |

Primary Examiner—Richard Bernard Lazarus
Attorney, Agent, or Firm—Sughrue, Rothwell, Mion, Zinn & Macpeak

[57] ABSTRACT

An injection/blow-moulding apparatus comprises two blow-moulds movable alternately with and out of co-operation with a rotatable turret along a common centre line. The turret is provided with two sets of cores carried one each by platens connected respectively one to each of two faces of the rotatable turret, which faces are at right angles one to the other. The turret is movable into and out of co-operation with a stationary injection mould along the centre line of the mould which centre line passes through the axis of rotation of the turret. The said common centre line of the blow-moulds also passes through the axis of rotation of the turret when the turret is in operative moulding relation with the injection mould. While one set of cores is in cooperation with the injection mould to have parisons injection moulded about one set of cores, parisons injection moulded about the other set of cores during the preceding injection moulding operation are blow-moulded in one of the blow-moulds. The turret is rotated through 90° alternately in opposite directions for cooperation with the blow-moulds to position the parisons on the cores for insertion into the blow-moulds.

10 Claims, 28 Drawing Figures

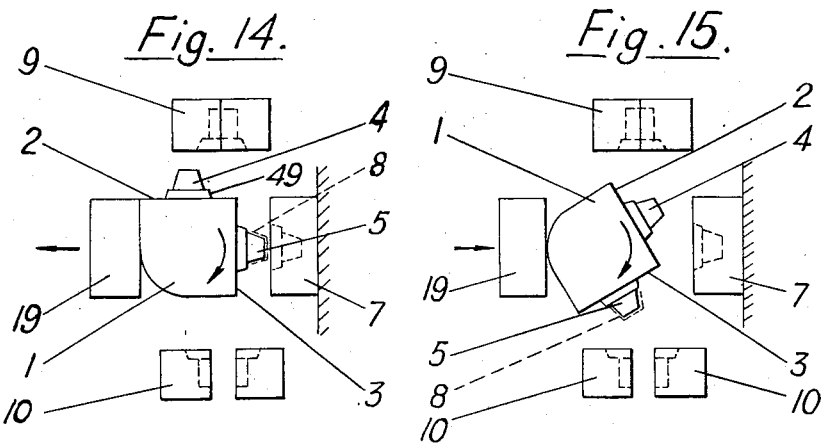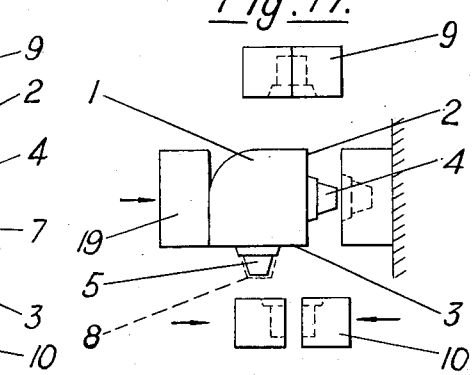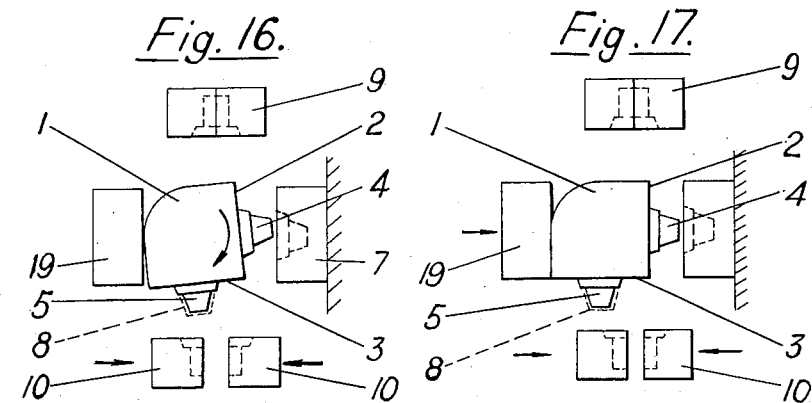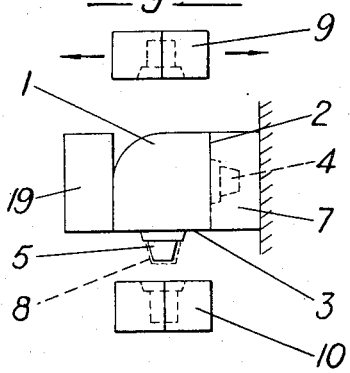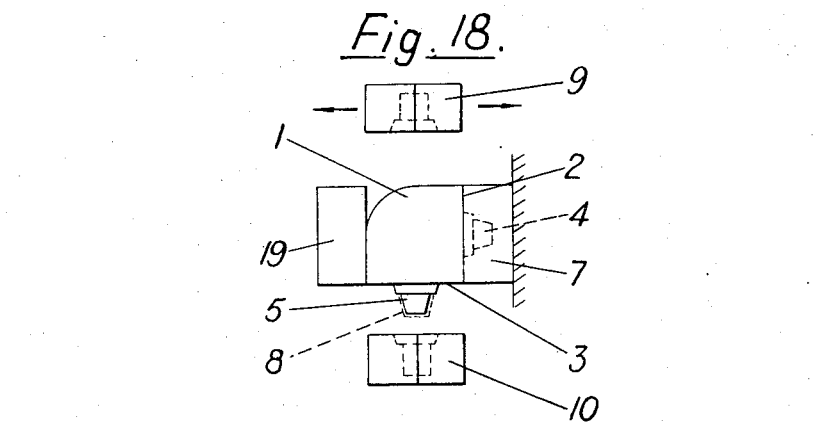

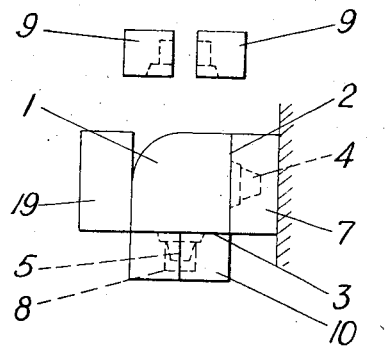
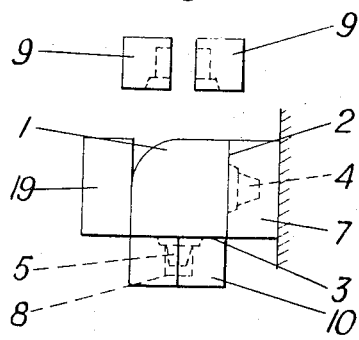
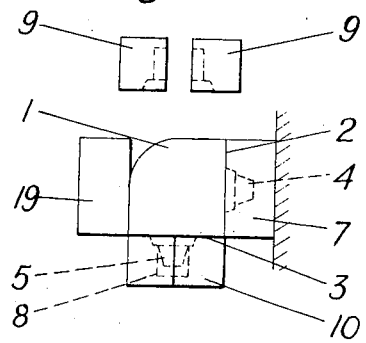
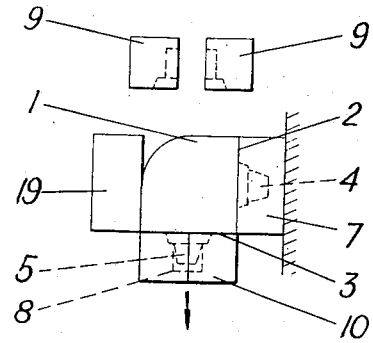
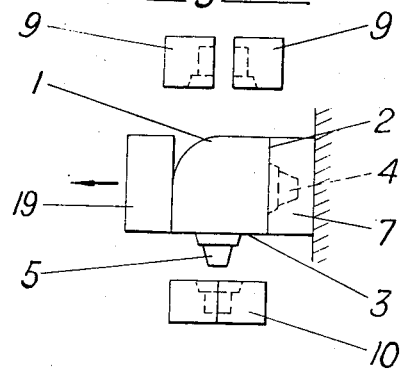

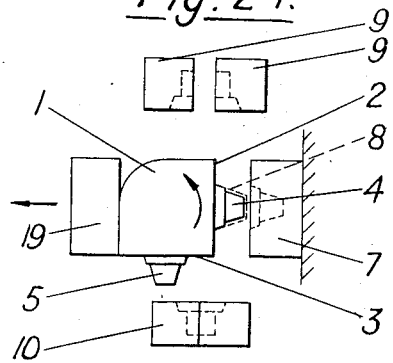
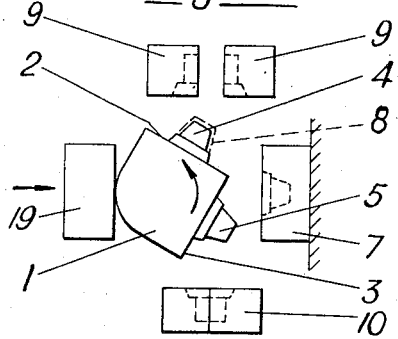
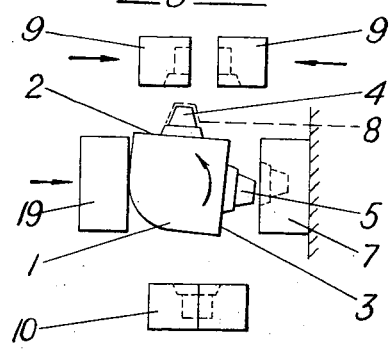
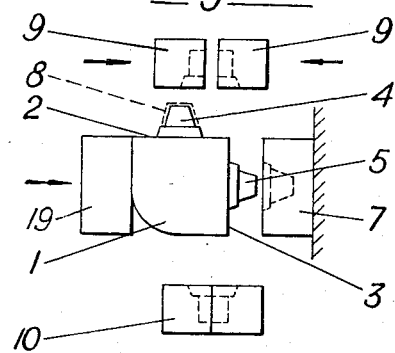
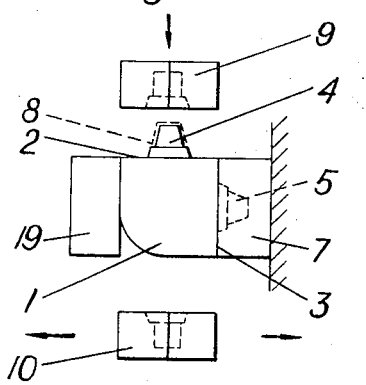

INJECTION/BLOW-MOULDING APPARATUS

BACKGROUND OF THE INVENTION

1. Field of the Invention

This invention relates to a method of and apparatus for moulding thermoplastics material and in particular to apparatus of the kind in which an injection moulded parison is introduced into a blow-mould, which may be sectional, and is blown therein to form a hollow article conforming to the shape of the interior of the blow-mould.

2. Description of the Prior Art

When producing articles by the injection/blow-moulding technique it is necessary first to injection mould the parison and then following cooling of the parison to transfer it to a blow-mould in which pressurised gas, usually air, is admitted into the parison to expand it to the shape of the interior of the blow-mould. This technique is of particular value in the moulding of plastics bottles because the neck of the bottle can be formed, with or without screw threads, during injection moulding and then be held in the neck portion of a blow-mould so that the blow-moulding part of the process is carried out only to form the body part of the bottle.

It has been proposed to carry out the injection/blow-moulding technique in a machine in which a platen carries a mould core on opposite sides thereof for simultaneous co-operation one with an injection mould part to form a parison on the core, and the other with a blow-mould. The platen is rotated through 180° after each injection/blow-moulding cycle. This proposal, however, has the disadvantage of slowness of operation because a second parison cannot be introduced into the blow-mould until the previous blow-moulded article has been cooled and ejected and in practice the time taken by blow-moulding plus subsequent cooling and ejection is substantially longer than that required for injection moulding and subsequent cooling and removal from the injection mould. Thus the rate of output of the machine is limited.

It is a main object of the present invention to provide an injection/blow-moulding machine which enables the rate or production to be substantially increased as compared with the previous proposal, and which will permit a conventional injection moulding machine to be adapted for injection/blow-moulding by a relatively simple conversion which can, if necessary, be reversed to permit the injection moulding machine to revert to ordinary injection moulding.

SUMMARY

Apparatus according to the invention comprises a stationary injection mould and two blow-moulds which latter are movable alternately into and out of cooperation with a rotatable turret along a centre line at right angles to the centre of the injection mould. The rotatable turret has two faces at right angles one to the other and each face carries a platen provided with at least one core. The turret is movable into and out of co-operation with the injection mould along the centre line of the injection mould and when one face carrying a core is in moulding relation with the injection mould the centre lines of the injection mould and the blow-moulds each pass through the axis of rotation of the turret. The turret is rotatable through 90° alternately in opposite directions to position a core carrying a parison injection moulded thereon for insertion into a blow-mould, and a parison is blow-moulded in one of the blow-moulds while another parison is being injection moulded in the injection mould.

DESCRIPTION OF THE PREFERRED EMBODIMENT

Figure 2:
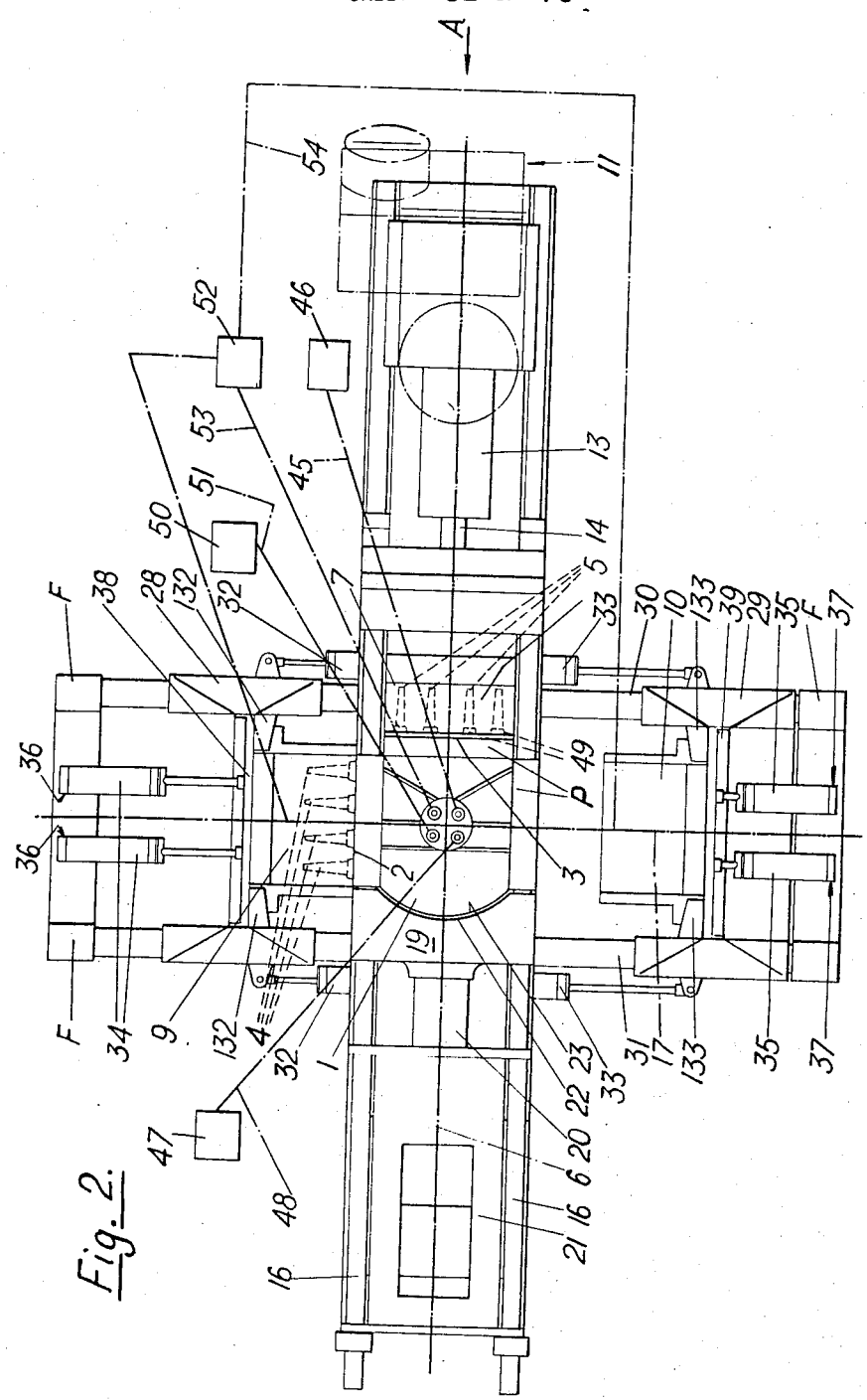
FIG. 2 is a top plan of FIG. 1 with some parts omitted for clarity.
Figure 3:
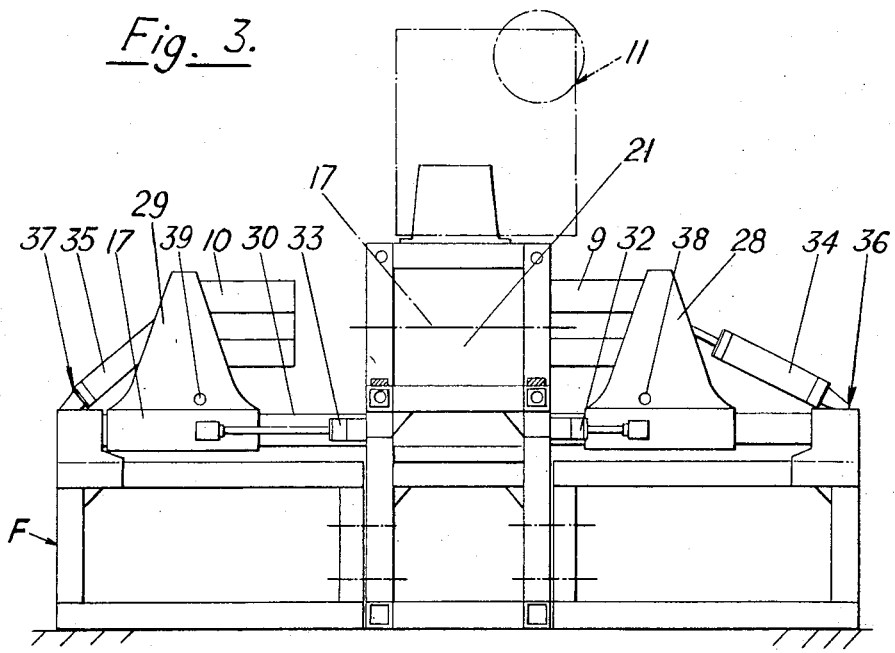
FIG. 3 is an end view of FIG. 2 in the direction of arrow A, but shows some parts in positions different from those which they occupy in FIG. 2, and some parts broken away.
Figure 4:
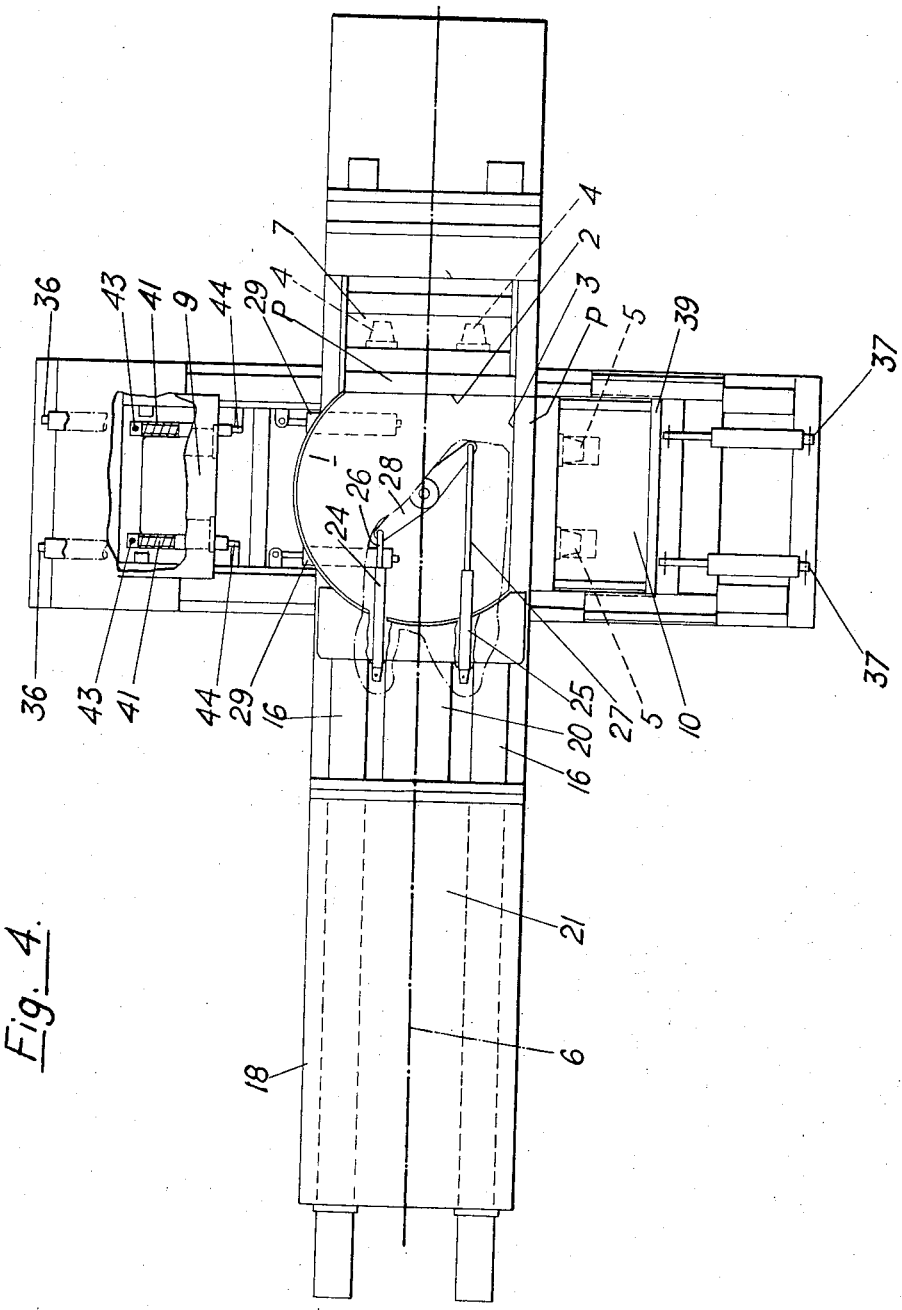
FIG. 4 is a diagrammatic plan illustrating some of the operating mechanism for the apparatus.
Figure 5:
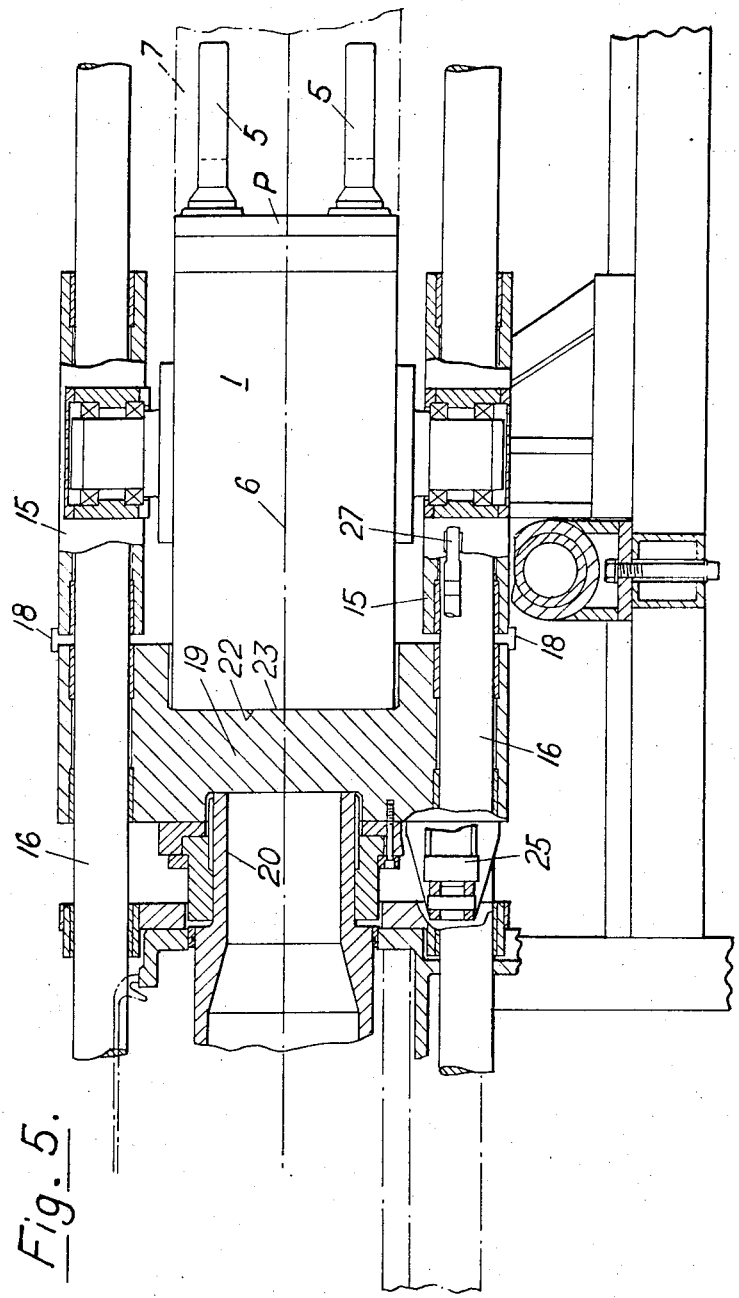
FIG. 5 is a section, with parts broken away, of a core-carrying turret in the position thereof in which the turret is fully withdrawn from operative co-operation with an injection mould.
Figure 6:
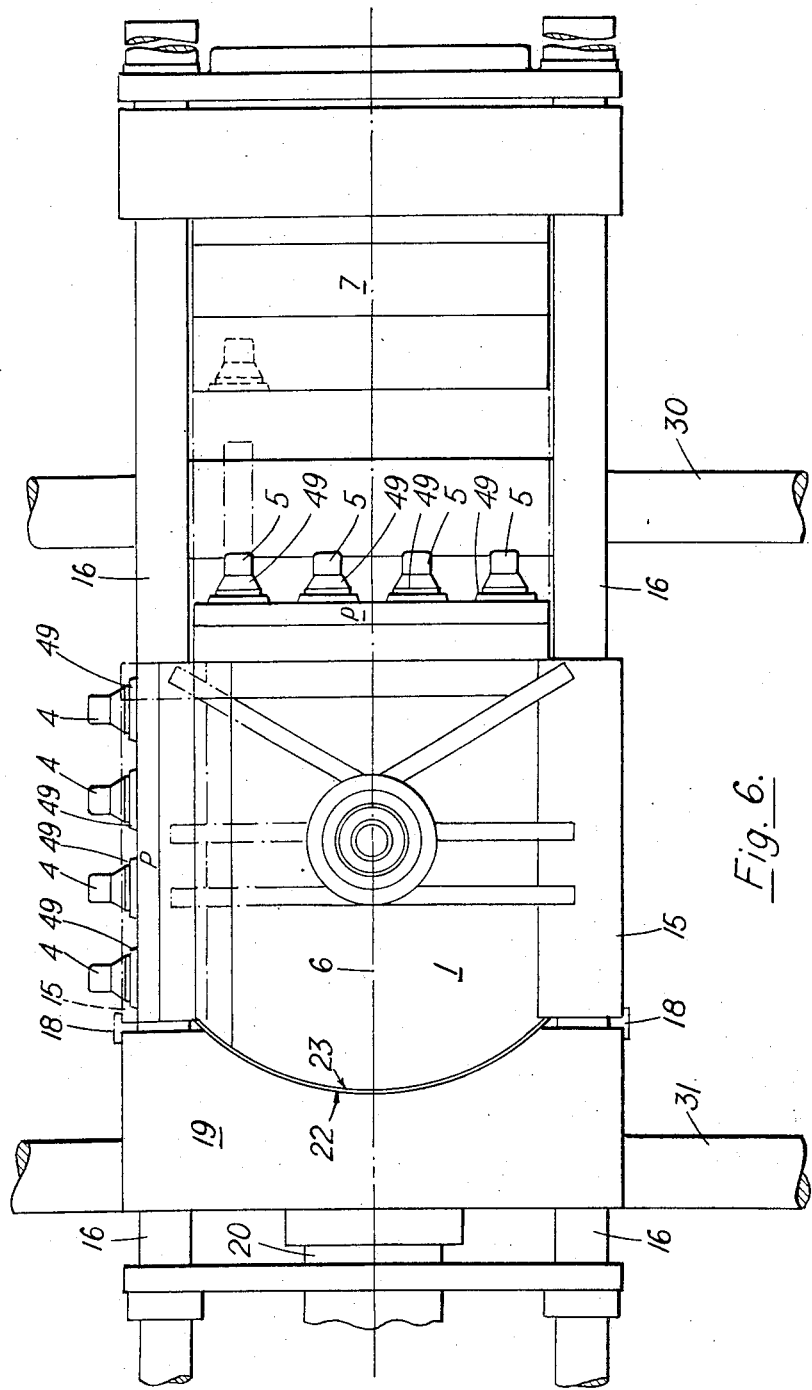
FIG. 6 is a plan of parts of FIG. 5.
Figure 8:
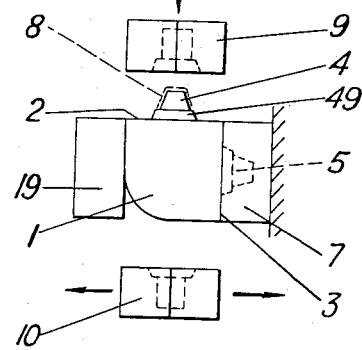

Referring to the drawings, a rotatable turret 1 has two faces 2, 3, FIG. 4, which are at right angles one to the other and are parallel to the axis, which is vertical, of rotation. At least one core 4 or 5 extends from each of the faces 2, 3 and the cores are carried by platens P, FIGS. 2 and 4 which are detachable from the faces 2, 3, to permit the cores to be selected according to the kind of article to be moulded. Each platen P may carry only one core but usually each platen will carry a plurality of cores, for example four arranged in line as indicated in FIGS. 2 and 6, or two in line as indicated in FIG. 4. Further, if desired each platen may carry two or more lines or cores arranged one over the other as indicated in FIG. 5. The axis of rotation is located on the centre line 6 which passes through the face of an injection mould 7 in which parisons 8, FIGS. 8 to 28, are moulded about the cores for transfer thereby to one or other of two blow-moulds 9, 10 in which the parisons are blow-moulded to the shape of the interiors of the blow-moulds. The injection mould and the blow-moulds are each provided with a number and arrangement of mould cavities corresponding to the number and arrangement of the cores on a platen P. The blow-moulds may, if desired, be sectional moulds arranged to be opened and closed in any suitable manner, not shown, but in FIGS. 1 to 7 the blow-moulds are not of the sectional kind.

Figure 1:
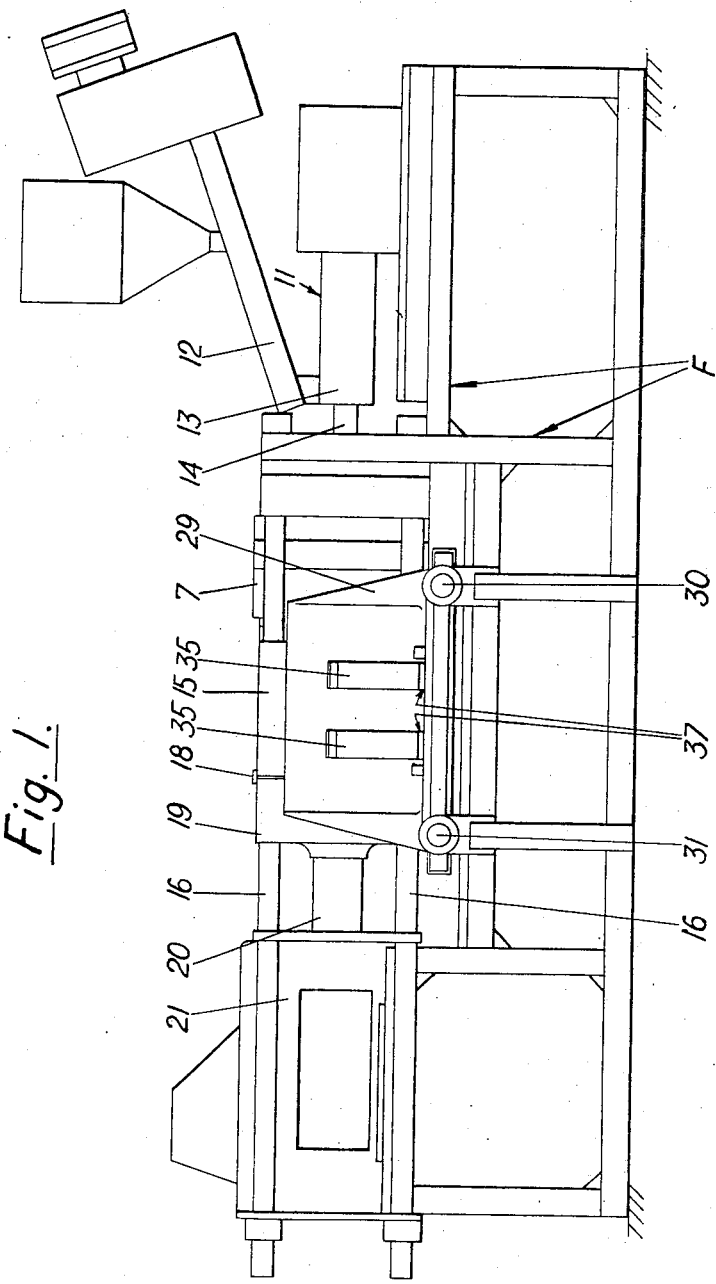
FIG. 1 is a diagrammatic side elevation of apparatus according to the invention.

The injection mould 7 is secured in a fixed position on the frame of the machine, indicated generally by the reference F, FIGS. 1 and 3, and is associated with any suitable known form of plasticiser and injection unit 11 by which molten thermoplastics material is fed into the injection mould. As indicated in the drawings the unit 11 is of the known kind in which molten thermoplastics material is fed by a screw, not shown, from a tube 12 past a non-return valve, not shown, into a chamber 13 housing a plunger, not shown, which is moved to the right as viewed in FIG. 1 by the thermoplastics material until a predetermined quantity is contained in the chamber to be injected, as a metered quantity, through a tube 14 into the injection mould.

The turret 1 is movable with a turret carriage 15, FIG. 5, supported on guide rods 16 for reciprocation along the centre line 6 to move a core 4 or 5 into and out of co-operation with the injection mould 7. FIGS. 2 and 4 illustrate the position of the turret 1 when cores 5 are co-operating with the injection mould 7 and the cores 4, which carry parisons, are co-operating with the blow-mould 10. In this position of the turret the axis of rotation of the turret passes through the intersection of planes containing the centre line 6 and a centre line 17 passing through the faces of the blow-moulds 9, 10. These planes are at right angles one to the other. The carriage 15 is coupled by a flexible coupling 18 to a clamping member 19 which is also supported by the guide rods 16 and is connected to the plunger 20 of a known form of electromechanical operating unit 21 mounted on the frame F. The clamping member 19 has a concave face 22 concentric with the axis of rotation of the turret 1 and with a complementary convex face 23 which connects the faces 2, 3 of the turret. During a moulding cycle when the cores 4, 5 co-operate with the injection mould and one of the blow-moulds 9, 10 the faces 22, 23 abut to maintain the turret in co-operative relation with the injection mould 7. The load at this time exerted by the plunger 20 may be of the order of 250 tons. Following the moulding operations the active blow-mould is moved away from the turret 1, together with the articles blow-moulded in the mould, and the plunger 20 then moves to the left as viewed in FIGS. 2 and 4 to a position at which the cores carrying parisons moulded in the injection mould 7 are completely withdrawn from the injection mould and are spaced therefrom, FIG. 6. Before the plunger 20 reaches the end of its stroke the clamping member is moved thereby away from the turret sufficiently to permit rotation thereof free from constraint by the clamping member. Rotation of the turret 1 is now effected through an angle of 90° by hydraulic or pneumatic rams 24, 25, FIG. 4, the rods 26, 27 of which are connected to a two-armed lever 28 carried by the turret in a manner such that during rotation of the turret one rod exerts a "push" while the other exerts a "pull" as will be understood from FIG. 4.

Figure 7:
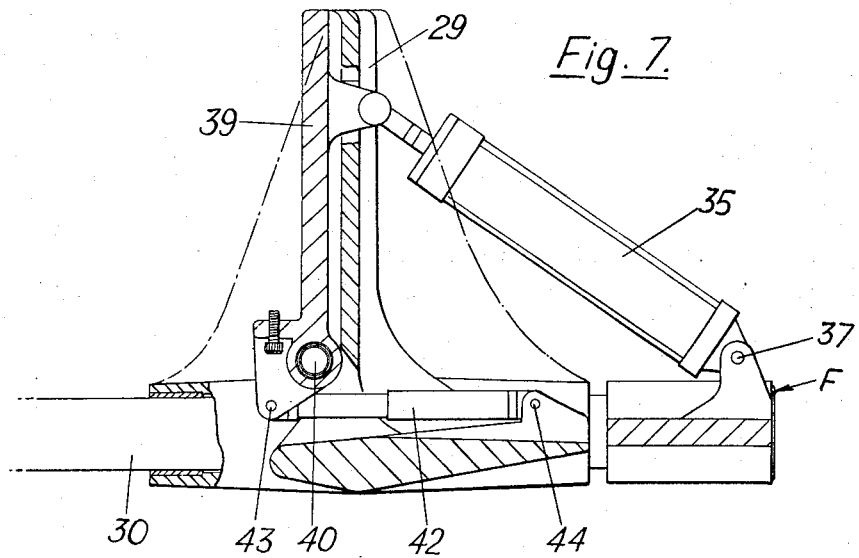
FIG. 7 is a section illustrating a detail of the apparatus, and FIGS. 8 to 28 diagrammatically illustrate the sequence of operations during one complete cycle thereof.

The blow-moulds 9, 10 are respectively movable with blow-mould carriages 28, 29 which are independently reciprocable into and out of co-operative relation with a core 4 or 5 as appropriate, aligned therewith. The carriages 28, 29 are slidable lengthwise of slideways 30, 31 by hydraulic or pneumatic rams 32, 33 and associated levers 132, 133, FIG. 2. Clamping jacks 34, 35 pivoted respectively at one end 36, 37, FIG. 3, to the frame F and at the opposite ends to the upper ends of mould mounting plates 38, 39 as illustrated in FIG. 7, are arranged to perform two functions, the first of which is to maintain the blow-moulds in tight moulding relation with the platens P and the second of which is to rotate the blow-moulds, following withdrawal thereof from moulding relation with the platens, to a position at which the open ends of the moulds face in a downward direction so that the moulded articles can be ejected from the moulds on to a conveyor, not shown, by which the articles can be removed in an ordered manner. To this end, the mould mounting plates 38, 39 are mounted on pivots 40 and subject to mechanical constraint exerted by springs 41, FIG. 4, contained in housings 42 pivoted respectively at 43, FIG. 7, to the lower ends of the plates 38, 39 and at 44 to the carriages 28, 29.

During a blow-moulding operation pressurised gas, usually air, is introduced into the mould through the cores and the turret, by a hose 45 connected to a compressor or the like 46, FIG. 2. As is usual, it is also desirable to maintain the cores in a warm condition and this is done by circulating heated oil or water around the cores, the heated liquid being delivered by a pump 47 and hose 48, and to effect cooling of the collar portion 49 of the cores cool water is circulated therearound by a pump 50 and hose 51. None of these features forms part of the invention and are therefore not described in detail.

It has, however, heretofore sometimes been found to be difficult to withdraw parisons from injection moulds without dislodging the parisons relative to the cores. To meet this difficulty it is proposed before moving the cores out of the injection mould to apply a negative air pressure to the cores to cause the parisons to adhere thereto. This is done by admitting negative air pressure from a vacuum pump 52 to the cores via a hose 53 and the turret 1, utilising the passages in the cores which are subsequently used to direct pressurised air into the parisons to effect blow-moulding.

When the blow-moulds are not sectional moulds it is also sometimes difficult to remove blow-moulded articles from the cores and it is therefore proposed, before disengaging a blow-mould from its associated cores, to apply negative air pressure to the interior of the blow-mould so that the articles adhere to the interior of the mould and are readily removed from the cores. This can be effected by connecting the vacuum pump to the blow-moulds as by hoses 54. The negative air pressure is relieved to permit ejection of the articles from the mould and ejection is effected in any suitable known manner.

In the ensuing description of the method of moulding, with reference to FIGS. 8 to 28, it will be assumed that each platen carries only one core and that each blow-mould has only one mould cavity and is a sectional mould.

A complete cycle of operations during which two parisons 8 are injection moulded and blow-moulded to shape takes, for example, 6 seconds and is illustrated in FIGS. 8 to 28, FIG. 8 representing zero time at which injection of a parison is commenced, a parison injection moulded during the previous injection moulding cycle being in position for blow-moulding in the blow-mould 9 and the blow-mould 9 being closed and commencing to move towards the parison. At this time an article in blow-mould 10, which is still closed, is cooling and the mould 10 is commencing to open.

Figure 9:
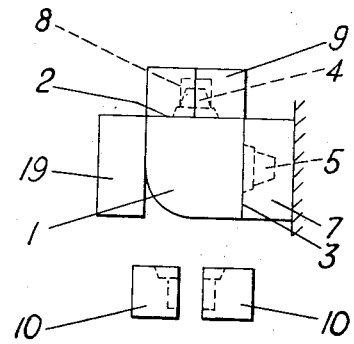

At 0.3 seconds, FIG. 9, injection of the parison is continuing, the blow-mould 9 has been moved into co-operative engagement with the platen, not shown, carried by the turret 1 ready for blow-moulding of the parison which is now within the blow-mould 9. The blow-mould 10 is fully open so that the article blow-moulded therein is ejected therefrom.

Figure 10:
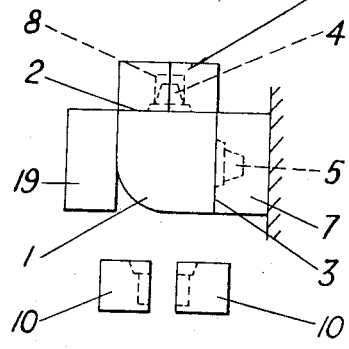

At 0.6 seconds, FIG. 10, injection moulding of the parison is complete, pressurised air is admitted to commence expansion of the parison in blow-mould 9, and blow-mould 10 is fully opened and in its fully retracted position.

Figure 11:
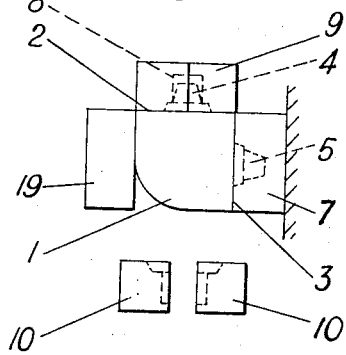

At 1.0 seconds, FIG. 11, blowing is continued in blow-mould 9, the parison in the injection mould 7 is cooling, and blow-mould 10 remains fully opened in its fully retracted position.

Figure 12:
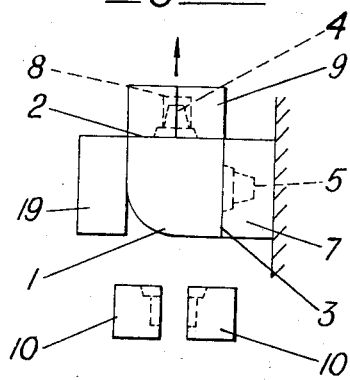

At 1.5 seconds, FIG. 12, blowing in the blow-mould 9 is complete, cooling of the article therein commences, and blow-mould 9 commences to move to its retracted position. The parison in the injection mould is still cooling, and blow-mould 10 remains fully opened in its fully retracted position.

Figure 13:
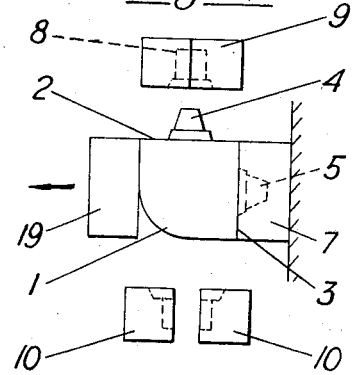

At 1.8 seconds, FIG. 13, cooling of the parison in the injection mould is completed, the moulded article in blow-mould 9 is cooling and the mould is fully retracted, blow-mould 10 remains fully open in its fully retracted position, and the turret 1 and clamping member 19 commence to move, to the left, to remove the parison from the injection mould.

At 2.0 seconds, FIG. 14, the article in blow-mould 9 is still cooling with the mould in its closed fully retracted position, the blow-mould 10 is still fully open in its fully retracted position, the turret 1 and clamping member 19 are still moving to the left but the parison is withdrawn from the injection mould and the turret is commencing to rotate clockwise.

At 2.4 seconds, FIG. 15, the article in blow-mould 9 is still cooling in the closed fully retracted mould 9, the blow-mould 10 which is still fully open and fully retracted commences to close, and the turret 1 which is still rotating clockwise commences to move to the right.

At 2.7 seconds, FIG. 16, the article in blow-mould 9 is still cooling in the closed fully retracted mould 9, the blow-mould 10 is closing, and the turret 1 is still rotating clockwise and is still moving to the right.

At 2.8 seconds, FIG. 17, the article in blow-mould 9 is still cooling in the closed fully retracted mould 9, the blow-mould 10 is still closing, and the turret 1 has stopped rotating but is still moving to the right.

At 3.0 seconds, FIG. 18, the article in blow-mould 9 is still cooling in the closed fully retracted mould 9, the blow-mould 10 is closed and commences to move towards the turret, and the turret 1 is again in operative relation with the injection mould 7 and injection commences with the parison carried by the core 5 aligned with the closed blow-mould 10.

At 3.3 seconds, FIG. 19, blow-mould 9 opens and ejects the moulded article therefrom, injection continues in the injection mould 7, the blow-mould 10 is in operative engagement with the platen, not shown, carrying the core 5 and parison and pressurised air is admitted to commence expansion of the parison now contained in the blow-mould 10.

At 3.6 seconds, FIG. 20, the blow-mould 9 is fully open and fully retracted, blowing is continuing in blow-mould 10, and injection in mould 7 is completed.

At 4.0 seconds, FIG. 21, the blow-mould 9 is fully open and fully retracted, blowing continues in blow-mould 10, and cooling of the parison in the injection mould 7 continues.

At 4.5 seconds, FIG. 22, the blow-mould 9 is fully open and fully retracted, blowing is completed in blow-mould 10 and mould 10 commences to retract, cooling of the parison contines in the injection mould 7.

At 4.8 seconds, FIG. 23, the blow-mould 9 is fully open and fully retracted, blow-mould 10 is fully retracted and the article blown to shape therein is cooling, cooling of the parison in the injection mould 7 is completed.

At 5.0 seconds, FIG. 24, the blow-mould 9 is fully open and fully retracted, blow-mould 10 is fully retracted and the article therein is cooling, the turret 1 and clamping member 19 are moving to the left, the parison is withdrawn from the injection mould 7 and the turret is commencing to rotate counterclockwise.

At 5.4 seconds, FIG. 25, the blow-mould 9 is fully open and fully retracted, blow-mould 10 is fully retracted and the article therein is still cooling, the turret 1 has commenced to move to the right but is still rotating counterclockwise.

At 5.7 seconds, FIG. 26, the blow-mould 9 is commencing to close, blow-mould 10 is fully retracted and the article therein is still cooling, the turret 1 is still moving to the right and rotating counterclockwise.

At 5.8 seconds, FIG. 27, the blow-mould 9 is still closing, blow-mould 10 is fully retracted and the article therein is still cooling, rotation of the turret has stopped but it is still moving to the right.

At 6.0 seconds, FIG. 28, the blow-mould is aligned with the parison carried by the core 4 and commences to move towards the turret 1, the platen, not shown, carrying core 5 now being fully engaged with the injection mould 7, injection commences, and blow-mould 10 commences to open.

By moulding articles by the method and apparatus described herein the rate of output has been considerably increased as compared with that of previously known injection blow-moulding machines, and it is also possible to use the machine for the purpose of injection moulding only and using the rotation of the turret 1 to obtain the advantage of moulding longer components on a fixed stroke machine, (that is a component which is longer than is possible on a standard injection process because of ejection clearances). The actuating means of the blow-moulds can then be used for take-off or other ancillary operations.

We claim:

1. Apparatus for moulding articles from thermoplastics material, said apparatus comprising platens connected respectively one to each of two faces of a rotatable turret and each having at least one core extending therefrom, said faces being at right angles one to the other and parallel to the axis of rotation, a stationary injection mould the centre line of which passes through the axis of rotation of the turret and at right angles thereto, means to feed molten thermoplastics material to the injection mould, actuating means operable to move the turret along the centre line of the injection mould into and out of moulding relation therewith, turret-rotating means operable during alternate periods during which the turret is withdrawn from operative moulding relation with the injection mould to rotate the turret through 90° in one direction during one said period and in the opposite direction during the next said period, two blow-moulds aligned one with the other and having a common centre line which is at right angles to the centre line of the injection mould and passes through the axis of rotation of the turret when a platen of the turret is in operative moulding relation with the injection mould, blow-mould moving means operable to move the blow-moulds alternately along said common centre line into blow-moulding relation with the turret when the turret is in moulding relation with the injection mould, and means operable to apply pressurised gas to a core or cores extending from the platen operatively engaged by a blow-mould.

2. Apparatus according to claim 1, wherein the turret is movable with a turret carriage supported for reciprocation on guide rods and the actuating means comprises an axially reciprocable plunger connected to a clamping member supported for reciprocation on said guide rods and arranged to clamp the turret in moulding relation with the injection mould, and a flexible coupling which connects the turret carriage to the clamping member and which in the withdrawn position of the turret relative to the injection mould permit rotation of the turret without constraint by the clamping member.

3. Apparatus according to claim 2, wherein the said two faces of the turret are connected by a convex face concentric with the axis of rotation of the turret and the clamping member is provided with a concave face complementary to the said convex face.

4. Apparatus according to claim 1 including negative air pressure producing means connected to the turret and operable to apply negative air pressure to a core or cores in moulding relation with the injection mould before withdrawal of the turret from moulding relation with the injection mould to facilitate withdrawal of a moulded parison or parisons from the injection mould together with the core or cores about which the parison or parisons is or are moulded in the injection mould.

5. Apparatus according to claim 1 including negative air pressure producing means connected to the interior of each of the blow-moulds and operable to apply negative air pressure to the interior of a mould before withdrawal thereof from moulding relation with the turret whereby an article or articles blow-moulded in the blow-mould is or are adhered to the interior of the blow-mould for removal with the blow-mould from moulding relation with the turret.

6. Apparatus according to claim 1, wherein each blow-mould is supported by a plate pivotally mounted on a blow-mould carriage reciprocable along slideways, and at least one elongate clamping jack is pivoted at one end to a stationary member and at the opposite end to said plate, said jack or jacks being operable in the moulding position of the blow-mould to maintain the blow-mould in tight blow-moulding relation with the turret and in the withdrawn position of the blow-mould to turn the plate about its pivot to a position at which the open end or ends of the blow-mould is or are directed in a downward direction for ejection of a blow-moulded article or articles from the blow-mould.

7. Apparatus according to claim 3, wherein each blow-mould is supported by a plate pivotally mounted on a blow-mould carriage reciprocable along slideways, and at least one elongate clamping jack is pivoted at one end to a stationary member and at the opposite end to said plate, said jack or jacks being operable in the moulding position of the blow-mould to maintain the blow-mould in tight blow-moulding relation with the turret and in the withdrawn position of the blow-mould to turn the plate about its pivot to a position at which the open end or ends of the blow-mould is or are directed in a downward direction for ejection of a blow-moulded article or articles from the blow-mould.

8. Apparatus according to claim 3 including negative air pressure producing means connected to the turret and operable to apply negative air pressure to a core or cores in moulding relation with the injection mould before withdrawal of the turret from moulding relation with the injection mould to facilitate withdrawal of a moulded parison or parisons from the injection mould together with the core or cores about which the parison or parisons is or are moulded in the injection mould.

9. Apparatus according to claim 3 including negative air pressure producing means connected to the interior of each of the blow-moulds and operable to apply negative air pressure to the interior of a mould before withdrawal thereof from moulding relation with the turret whereby an article or articles blow-moulded in the blow-mould is or are adhered to the interior of the blow-mould for removal with the blow-mould from moulding relation with the turret.

10. Apparatus according to claim 4 including negative air pressure producing means connected to the interior of each of the blow-moulds and operable to apply negative air pressure to the interior of a mould before withdrawal thereof from moulding relation with the turret whereby an article or articles blow-moulded in the blow-mould is or are adhered to the interior of the blow-mould for removal with the blow-mould from moulding relation with the turret.

* * * * *

UNITED STATES PATENT OFFICE
CERTIFICATE OF CORRECTION

Patent No. 3,807,923      Dated April 30, 1974

Inventor(s) Geoffrey Donald Cannon et al

It is certified that error appears in the above-identified patent and that said Letters Patent are hereby corrected as shown below:

In the heading, the priority date was omitted. Should read:

January 12, 1972    Great Britain.............. 1465/72

Signed and sealed this 1st day of October 1974.

(SEAL)
Attest:

McCOY M. GIBSON JR.
Attesting Officer

C. MARSHALL DANN
Commissioner of Patents